Patented Nov. 11, 1930

1,781,238

UNITED STATES PATENT OFFICE

WALTER MIEG, OF OPLADEN, GERMANY, ASSIGNOR TO GENERAL ANILINE WORKS, INC., OF NEW YORK, N. Y., A CORPORATION OF DELAWARE

NEW VALUABLE VAT DYESTUFFS OF THE ANTHRAQUINONE SERIES

No Drawing. Application filed July 8, 1929, Serial No. 376,362, and in Germany July 9, 1928.

The present invention relates to new valuable vat dyestuffs of the anthraquinone series, and more particularly to products having most probably the following general formula:

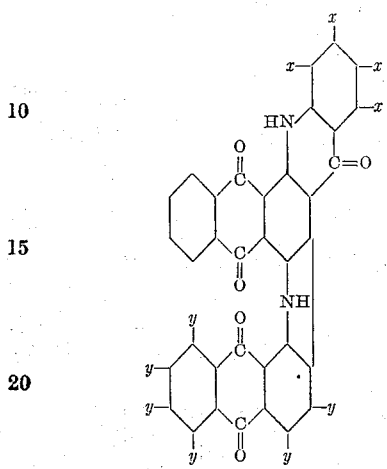

wherein $x$ stands for hydrogen or halogen but at least one $x$ being a halogen atom and $y$ stands for hydrogen or an acylamino group, but at least one $y$ being an acylamino group. These dyestuffs are prepared by acting with a condensing agent of an acid character such as concentrated sulfuric acid, chlorosulfonic acid and a mixture of 3–5 parts of aluminium chloride and 1 part of sodium chloride or 3–25 parts of pyridine on a dianthraquinonylamine containing an acridone ring which is substituted by at least one halogen atom and containing at least one acylamino group. The condensation is carried out at a temperature of about 10–40° C. and higher when the condensation is effected by means of sulfuric acid or chlorosulfonic acid and at 130–160° C. and higher when a mixture of aluminium chloride and sodium chloride or pyridine is used as condensing agent. The quantity of the condensing agent employed may vary within wide limits; I prefer to use about ten times the quantity of the starting material, when sulfuric acid and chlorosulfonic acid are used as condensing agents and three to five times the quantity when aluminiumchloride-sodium chloride or aluminiumchloride pyridine is used.

The condensing action proceeds in two stages, firstly on intermediate product is formed, whose nature is up to now unknown and this intermediate product is then oxidized to the vat dyestuff. When effecting the condensation with chlorosulfonic acid at normal temperature or with strong sulfuric acid at an elevated temperature say about 40° C. the oxidation of the first formed condensation product proceeds in the same process; when working with a mixture of aluminiumchloride and sodiumchloride or pyridine or with sulfuric acid at normal temperature say about 10–20° C. it is necessary to oxidize the obtained condensation product by means of sodium nitrite, air, sodium hypochlorite.

The products obtainable in this manner by carbazole ring formation are valuable vat dyestuffs. They dye cotton in the vat from reddish-grey to olive-brown shades with excellent fastness properties. In the dry state they are dark powders dissolving in concentrated sulfuric acid with an intense coloration and being readily vatted by an alkaline hydrosulfite solution.

The invention is illustrated by the following examples, without being limited thereto; the parts being by weight.

*Example 1.*—10 parts of the dianthraquinonylamine derivate obtained by the condensation of one molecular proportion of trichloroanthraquinone acridone (German Pat. No. 258,561, Example 4) with one molecular proportion of 1-benzolyamino-5-amino-anthraquinone are dissolved in 100 parts of concentrated sulfuric acid. The solution, which is at first yellowish-brown, quickly acquires, even at the ordinary temperature a brownish-olive coloration. On stirring into water there is produced a dark green precipitate, which on the addition of suitable oxidizing agents, such as sodium nitrite or a sodium hypochlorite solution, becomes a dark olive-brown. After then heating to about 70° C. a dyestuff is obtained, which dissolves in concentrated sulfuric acid with a deep blue coloration and dyes cotton fast blackish-brown shades, while the starting material, vatted as a powder, yields greenish-grey dyeings.

*Example 2.*—One molecular proportion of the amino compound obtainable by reduction of the nitrated chloroanthraquinone acridone (U. S. Pat. Ser. No. 1,052,507, Example 1) is condensed to the dianthraquinonylamine derivative with one molecular proportion of 1-benzoyl-amino-5-chloro-anthraquinone in the customary manner by heating in a high boiling solvent in the presence of anhydrous sodium acetate and small quantities of a copper salt. To convert the dianthraquinonylamine derivatives into the carbazole it is stirred at room temperature into 15 parts of chlorosulfonic acid. A deep blue solution is very soon formed, from which on pouring into water a dark olive-brown precipitate is produced. The dyestuff thus obtained is identical with that of Example 1. It has the following probable formula:

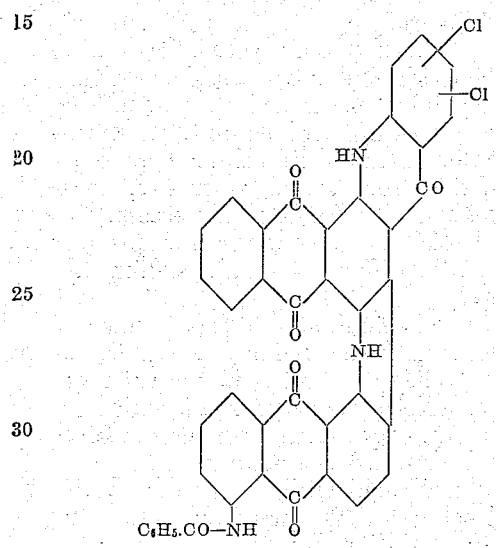

The same vat dyestuff is also obtained when the closing of the carbazole ring is carried out with other acid condensing agents, for example by means of an aluminium chloride melt.

I claim:

1. As new products the compounds of the probable general formula:

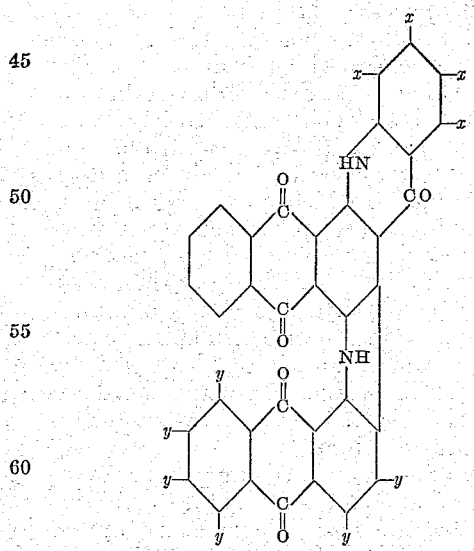

wherein one $x$ stands for halogen and the other $x$'s for hydrogen atoms which may be substituted by halogen and one $y$ stands for an acylamino group and the other $y$'s for hydrogen atoms which may be substituted by acylamino groups, being in the dry state dark powders dissolving in concentrated sulfuric acid with an intense coloration and dyeing cotton from an alkaline hydrosulfite vat reddish-grey to olive-brown shades of excellent fastness properties.

2. As a new product the compound of the probable formula:

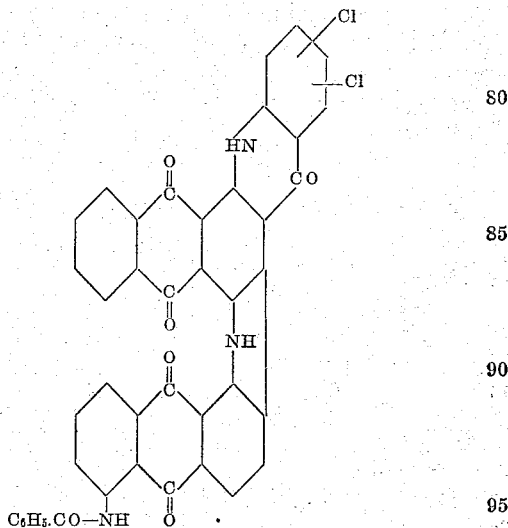

being in the dry stage a black-brown powder dissolving in concentrated sulfuric acid with a deep blue coloration, yielding readily with an alkaline hydrosulfite solution a yellow-brown vat and dyeing cotton therefrom in black-brown shades of excellent fastness properties.

In testimony whereof I have hereunto set my hand.

WALTER MIEG.